(12) United States Patent
Cs et al.

(10) Patent No.: US 9,170,326 B2
(45) Date of Patent: *Oct. 27, 2015

(54) SYSTEM AND METHOD FOR DOPPLER RADAR MONITORING OF RESTRICTED AREAS BELOW BUCKET TRUCKS, LINEWORKERS ON POWER DISTRIBUTION POLES OR OTHER ELEVATED LOADS

(71) Applicant: Honeywell International Inc., Morristown, NJ (US)

(72) Inventors: Adishesha Cs, Karnataka (IN); Antonio Vitucci, Wauconda, IL (US)

(73) Assignee: Honeywell International Inc., Morristown, NJ (US)

( * ) Notice: Subject to any disclaimer, the term of this patent is extended or adjusted under 35 U.S.C. 154(b) by 294 days.

This patent is subject to a terminal disclaimer.

(21) Appl. No.: 13/843,809

(22) Filed: Mar. 15, 2013

(65) Prior Publication Data

US 2014/0266854 A1 Sep. 18, 2014

(51) Int. Cl.
| | |
|---|---|
| *G01S 13/00* | (2006.01) |
| *G01N 27/26* | (2006.01) |
| *G01S 7/292* | (2006.01) |
| *A61B 5/02* | (2006.01) |
| *A61B 5/11* | (2006.01) |
| *G01S 13/04* | (2006.01) |
| *G01S 7/00* | (2006.01) |
| *G01S 13/34* | (2006.01) |

(52) U.S. Cl.
CPC ................. *G01S 13/04* (2013.01); *G01S 7/003* (2013.01); *G01S 13/34* (2013.01)

(58) Field of Classification Search
CPC ......... G08B 21/22; H04N 7/181; H04N 7/185
USPC .......................................................... 348/77
See application file for complete search history.

(56) References Cited

U.S. PATENT DOCUMENTS

| | | | | |
|---|---|---|---|---|
| 5,281,949 | A | * | 1/1994 | Durley et al. .................. 340/433 |
| 6,359,582 | B1 | * | 3/2002 | MacAleese et al. ............. 342/22 |
| 2010/0130873 | A1 | * | 5/2010 | Yuen et al. ..................... 600/484 |

* cited by examiner

*Primary Examiner* — Hee-Yong Kim
(74) *Attorney, Agent, or Firm* — Wood, Phillips, Katz, Clark & Mortimer

(57) ABSTRACT

A method and system (10) are provided for monitoring a restricted area (12) below a temporarily elevated worker (14) working on an elevated power transmission line (16). The method and system (10) utilize a Doppler radar module (40) that is temporarily elevated to a location (32) adjacent the worker (14) and that is configured to detect the presence of personnel (34) who enter the restricted area (12). The system (10) is configured to automatically alert personnel (34) at the worksite (17) who enter the restricted area (12) in response to detection of the personnel (34) by the Doppler radar module (40).

18 Claims, 4 Drawing Sheets

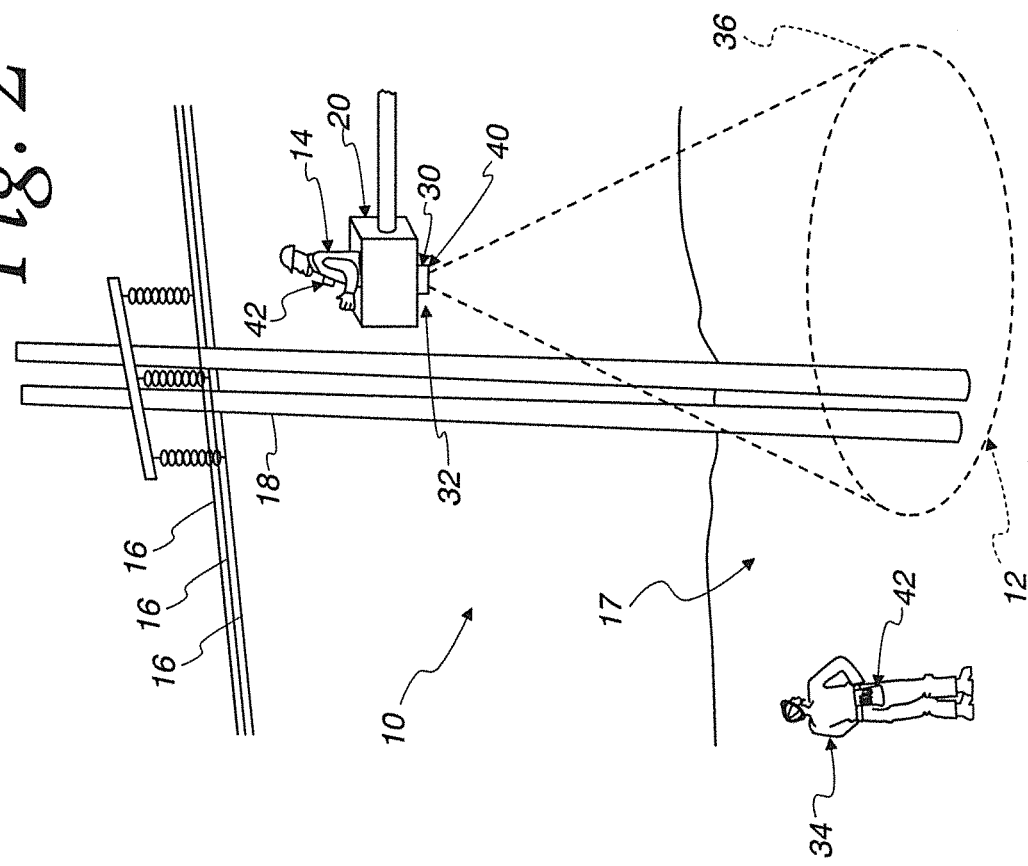
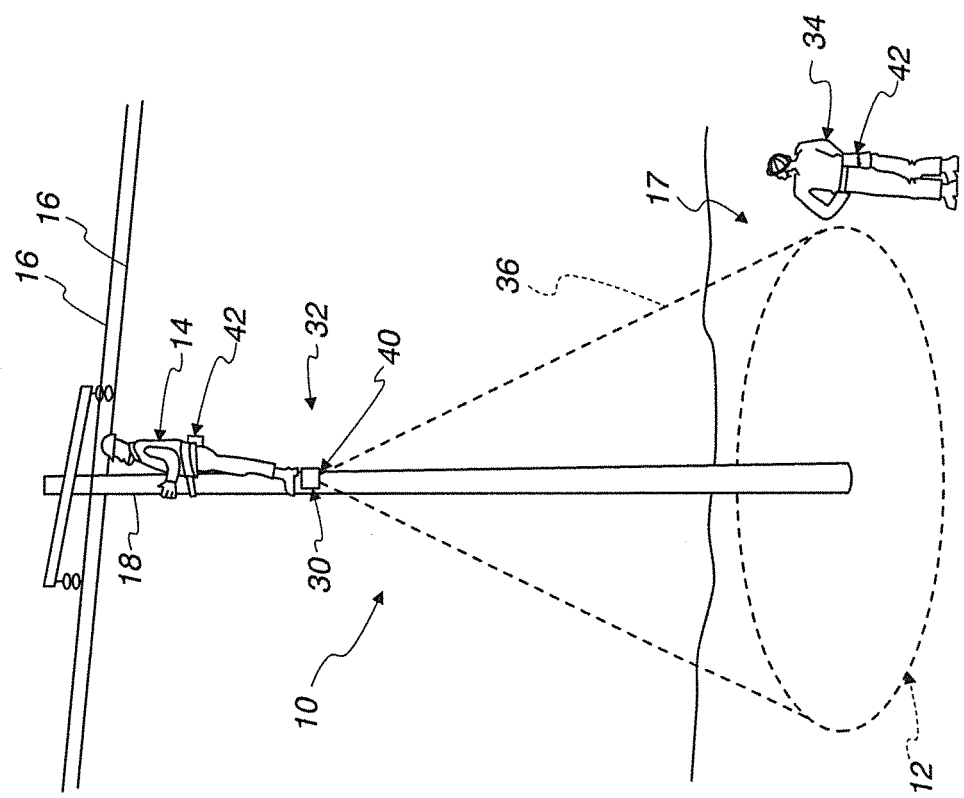

SYSTEM AND METHOD FOR DOPPLER RADAR MONITORING OF RESTRICTED AREAS BELOW BUCKET TRUCKS, LINEWORKERS ON POWER DISTRIBUTION POLES OR OTHER ELEVATED LOADS

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD

In general, this application relates to the monitoring of restricted areas below temporarily elevated workers, such as, for example, construction workers on high rise buildings, tree trimming crews, installation and commissioning crews, and window washers. In one particular example, this application relates to wired distribution systems that utilize runs of transmission wires that are mounted overhead by poles and towers, such as electric power distribution systems that utilize distribution poles and towers to mount electric power transmission lines elevated at a safe distance above ground level, and to the work zones around such elevated wired distribution systems when one or more lineworkers are working on the elevated wired distribution system.

BACKGROUND

Elevated lines are widely used for the transmission of electrical power and communications. Such lines must be installed and regularly maintained and repaired. When a lineworker performs such tasks while inside an elevated bucket, the area below the bucket is considered hazardous. Crews of lineworkers working at ground level can be exposed to objects that can fall accidentally, including energized lines, tools or other material. The same hazardous conditions exist when a lineworker climbs a distribution pole or tower to perform a task. The area underneath an elevated lift bucket or a lineworker working on a pole is a restricted area that is often referred to as "line-of-fire" and is considered hazardous since there is a potential for falling objects such as tools or other materials.

To protect lineworkers against these hazards, utilities use standards and methods for establishing line-of-fire boundaries aimed at keeping lineworkers out of the restricted areas. For example cones are often used to cordon off an area considered hazardous. While these methods can be effective they are not capable of constantly monitoring and alerting lineworkers when someone crosses the boundary inadvertently. Accordingly, there is always room for improvement.

SUMMARY

In accordance with one aspect of the application, a method is provided for monitoring restricted areas below a temporarily elevated worker. The method includes the steps of elevating a Doppler radar module to an elevated location adjacent a worker that is temporarily positioned above ground level, enabling the Doppler radar module to detect the presence of other personnel who enter a ground level restricted area below the Doppler radar module and the worker, automatically alerting personnel who enter the restricted area in response to detection of the personnel by the Doppler radar module, lowering the Doppler radar module from the elevated location in response to the worker returning to ground level, and disabling the Doppler radar module.

As one feature, the enabling step includes enabling a programmable processor to determine a Doppler effect in response to the radio frequency signal being reflected off of a person in the restricted area.

In one feature, the enabling step includes automatically adjusting a size of the restricted area in response to changes in height of the elevated location. According to a further feature, the method further includes moving the Doppler radar module with the worker in response to changes in the position of the worker. In yet a further feature, the method further includes the step of attaching the Doppler radar module to a lift platform that alters the position of the worker above ground level.

According to one feature, the method further includes the step of temporarily attaching the Doppler radar module to a pole structure that is ascended by the worker.

In one feature, the method further includes the step of attaching the Doppler radar module to a lift platform that alters the position of the worker above ground level.

As one feature, the enabling step comprises calibrating the Doppler radar module based on a radar return signal from the background terrain within the restricted area. As a further feature, the method further comprises the step of automatically calibrating the Doppler radar module with the background terrain in response to a change in the elevated location.

According to one feature, the method includes the step of detecting the presence or absence of personnel in the restricted area in response to a change in the radar return signal.

As one feature, the method includes the step of wirelessly transmitting a data signal representative of a received Doppler radar signal from the Doppler radar module to a controller and processing the data signal in the controller to determine the presence or absence of personnel in the restricted area. As a further feature, the method includes the step of wirelessly transmitting an alert signal from the controller to at least one wireless receiver configured to receive the alert signal and generate an alarm to a worker carrying the wireless receiver.

In one feature, the method includes the step of converting an intermittent frequency signal generated by the Doppler radar module to In-phase & Quadrature channel data. In a further feature, the method includes the step of converting the intermittent frequency signal to a digital bit stream.

As one feature, the method includes the step of generating an alert signal based upon a statistical average of data derived from multiple consecutive return radar signals received by the Doppler radar module.

In accordance with one feature of the application, a system is provided for monitoring restricted areas below a temporarily elevated worker. The system includes a Doppler radar module configured to detect the presence of personnel who enter a ground level, restricted area below the Doppler radar module when the wireless sensor is elevated to an elevated location adjacent a temporarily elevated worker; and a programmable processor configured to automatically adjust a size of the restricted area in response to changes in height of the elevated location.

In accordance with one feature of the application, a system is provided for monitoring restricted areas below a temporarily elevated worker. The system includes a Doppler radar module configured to detect the presence of personnel who enter a ground level, restricted area below the Doppler radar module when the Doppler radar module is elevated to an elevated location adjacent a temporarily elevated worker. The Doppler radar module is further configured to wirelessly transmit a data bit stream representative of a return radar signal received by the Doppler radar module.

As one feature, the system further includes a controller configured to receive the data bit stream from the Doppler radar module and to determine the presence of personnel who enter the ground level, restricted area based upon an automatic analysis of the data bit stream; and a plurality of receivers configured to receive a wireless alert signal from the controller and to activate an alarm to notify personnel carrying the wireless receivers of the presence of a person in the ground level, restricted area.

According to one feature, the Doppler radar module is further configured to generate an intermittent frequency signal representative of a radar signal received by the Doppler radar module, to convert the intermittent frequency signal to In-Phase & Quadrature channel data, and to further convert the In-Phase and Quadrature channel data to a data bit stream for wireless transmission.

Other features and advantages will become apparent from a review of the entire specification, including the appended claims and drawings.

BRIEF DESCRIPTION OF THE DRAWINGS

FIG. 1 is a somewhat diagrammatic representation of a worksite at an elevated power transmission line employing a method and system for monitoring a restricted area below a temporary elevated worker on a power pole at the worksite;

FIG. 2 is a figure similar to FIG. 1, but showing the lineworker elevated in a lift bucket;

DETAILED DESCRIPTION

Figure 3:
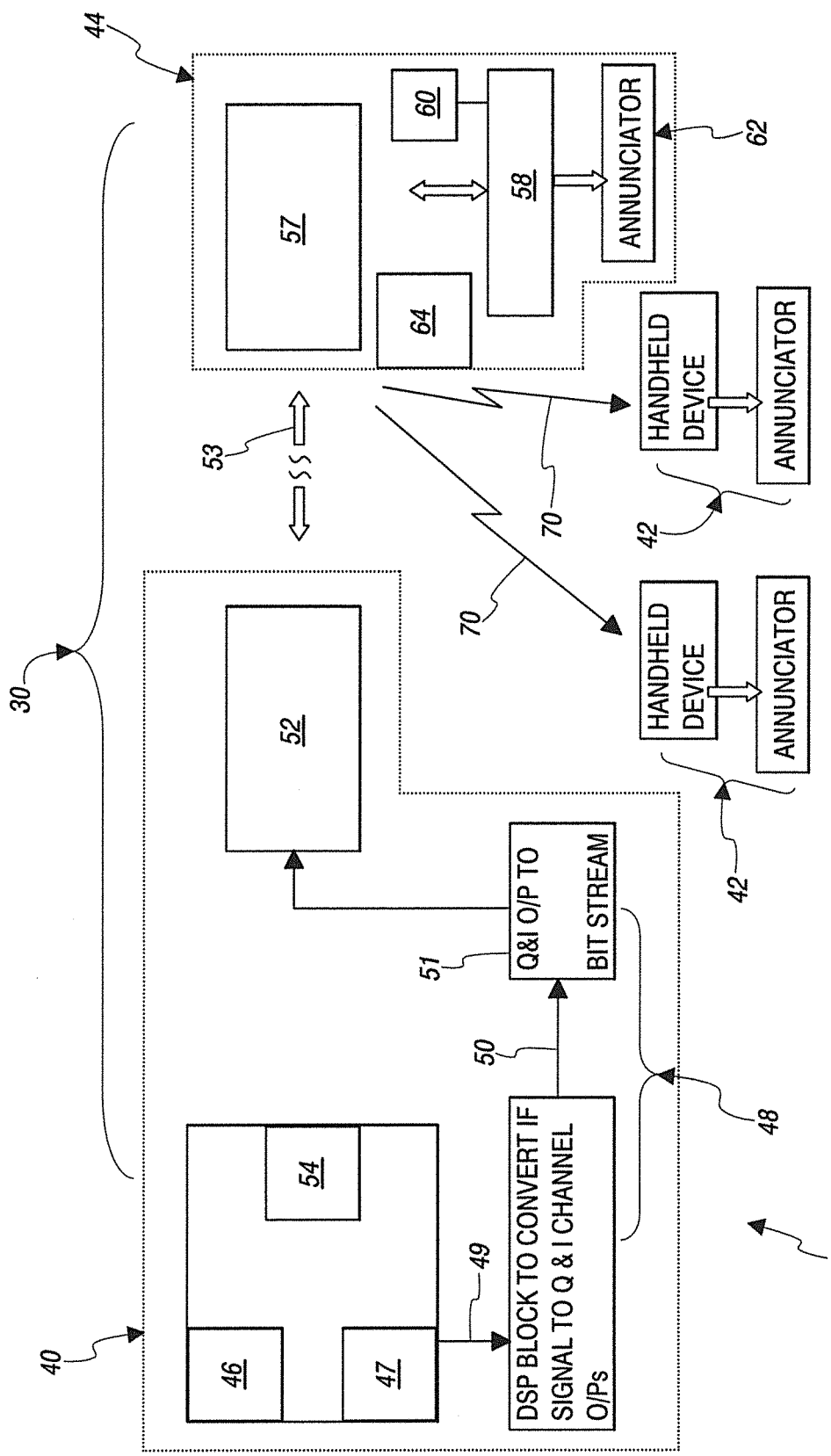
FIG. 3 is a diagrammatic representation of the system and method of FIGS. 1 and 2.

With reference to FIGS. 1 and 2, a method and system are shown diagrammatically at 10 for monitoring a restricted area 12 below a temporarily elevated worker 14, such as a lineworker 14, working on an elevated power transmission line 16 at a worksite 17 after having ascended a distribution pole or tower 18 (FIG. 1) or having been elevated by a lifting device, such as a lift bucket 20 (FIG. 2). The method and system 10 utilize a Doppler radar system 30 that is temporarily elevated to a location 32 adjacent the worker 14 and that is configured to detect the presence of personnel, such as other lineworkers 34, who enter the restricted area 12 below the Doppler radar system 30 when the Doppler radar system 30 is elevated to the location 32 adjacent the elevated worker 14. The restricted area 12 will typically be of a predetermined size at ground level below the elevated worker 14. In the is regard, the system 30 is configured to generate a radiation pattern 36 and to automatically alert personnel 34 at the worksite 17 who enter the restricted area 12 in response to detection of the personnel 34 by the Doppler radar system 30. Further in this regard, it should be appreciated that the radiation pattern 36 encompasses the restricted area 12, with the restricted area 12 being defined within the radiation pattern 36 as a virtual restricted boundary (VRB). If a lineworker 34 enters the restricted area 12, the system 30 is configured to use the Doppler effect (the change in frequency that is observed when the transmitted RE signal is reflected from a lineworker 34 crossing the boundary of the restricted area 12) to detect a lineworker 34 in the restricted area 12. The Doppler radar system 30 is either portable so it can be temporarily located on a power pole or transmission tower 18 that has been ascended by a worker 14, such as shown in FIG. 1, or is fixed to a lift platform 20 that supports the elevated worker 14, such as the lift bucket 20, so that the Doppler radar system 30 moves with the worker 14 in response to changes in the position of the worker 14 and lift bucket 20, such as shown in FIG. 2.

While there are several possible technologies that can be utilized for the system 10, in one embodiment shown diagrammatically in FIG. 3, the system 10 includes a Doppler radar unit or module 40 to detect the presence or absence of a person in the restricted area, a plurality of receiver modules 42 worn by the personnel 34 (one module 42 per person 34) at the worksite 17, and a controller 44 in the form of a monitoring, display, and annunciation center configured to automatically transmit a wireless alert signal to the receiver modules 42 to activate an alarm (audio, visual, and/or vibrational) in each module 42 whenever the controller 44 determines the presence of a person in the restricted area 12 based on an analysis by the controller 44 of a wireless signal transmitted from the Doppler radar module 40 to the controller 44. In some embodiments, the alarm in each module 42 will continue to sound until the system 30 has determined that no person is present in the restricted area 12. In some embodiments, the controller 44 can be located in the truck (not shown) of the lift bucket 20 or any other suitable location at the worksite 17 remote from the module 40. The Doppler radar module 40 and the remote controller 44 combine to define the Doppler radar system 30.

In one embodiment the Doppler radar module 40 includes a transmitter section or antenna 46, a receiver section or antenna 47, a signal processor section 48 in the form of a microcontroller coupled to the transmitter and receiver sections 46 and 47 to receive an Intermittent Frequency (IF) output signal 49 therefrom and convert the IF output signal to demodulator (Frequency Discriminator) output, In-Phase & Quadrature (I & Q) channel outputs (Sum Channel and Receive Channel) and then to convert the I & Q output 50 to digital bit stream using a series of low pass filters and an analog to digital converter (ADC) 51, a wireless transceiver or modem 52 coupled with the signal processor section 48 to wirelessly transmit the I & Q channel data and digital bit stream (as shown at 53), and a power supply 54 for supplying power to the components 46, 47, 48 and 52. Optionally, the Doppler radar module 40 can also include an alert transducer system or annunciator that would also be powered by the power supply 54.

The Doppler radar technology of the module 40 can utilize frequency modulated continuous wave (FMCW) technology operating at 70 GHz or 32 GHz frequency, with the transmitter section 46 configured to emit radiation and the receiver section 47 configured pick up the target Doppler in the restricted area 12 as defined by the radiation pattern 36. The module 40 can be configured so that the radiation pattern 36 can be controlled to define the size of the restricted area 12 and so that the restricted area 12 can be dynamically defined and employed as a function of the height at which the lift bucket 29 is placed. It should be appreciated that any suitable transmitter section 46 and receiver section 47 can be used in the module 40, with many being known.

While there are many known controller or computing devices (such as dedicated servers, desk top computers, lap top computers, tablet computers, etc) that can receive, process, and transmit communication signals, including wireless signals, as best seen in FIG. 3, in one embodiment, the controller 44 includes a plurality of wireless transceivers or modems 57, a computer processor in the form of a microcontroller 58, a user interface 60 including a display, an alert transducer system or annunciator 62, and a power supply 64 connected to provide power to the components 57, 58, 60, and 62 of controller 44. The power supply 64 can be in the form of a rechargeable battery and/or a powered connection to a power source at the worksite 17, such as a power source in the truck of the lift bucket 20. The controller 44 is configured for at least one of the wireless transceivers 57 to receive the wireless signal 53 from the Doppler radar module 40 and to pass the I & Q channel data and digital bit stream to the processor 58 for analysis to determine if a person has entered the restricted area 12, if the processor 58 makes such a determination, the processor 58 initiates the alert transducer system 62 to provide an alarm (audio, visual, and/or vibrational) and controls at least one of the wireless transceivers 58 to transmit a wireless alert signal (as shown at 70) to the receiver modules 42 to initiate an alarm in each receiver module 42.

Figure 5A:
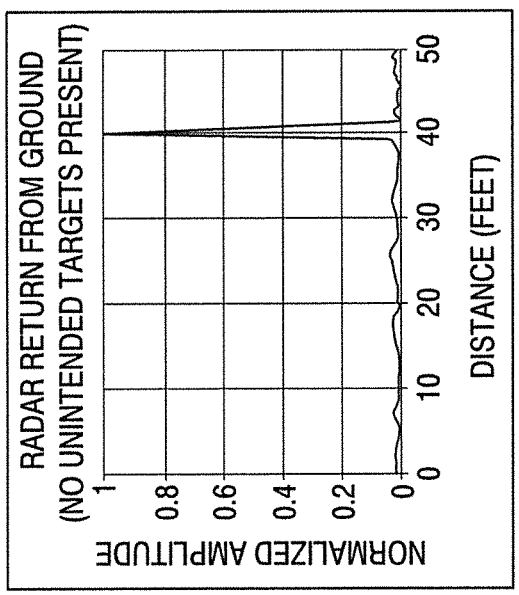
FIGS. 5A and 5B are graphical representations of a radar return signal generated by the system and method of FIGS. 1-4 as configured in FIG. 5C, with FIG. 5A showing the return signal representative of the background terrain within a restricted area and FIG. 5B showing the return signal representative of the background of a person within the restricted area together with the background terrain.
Figure 5B:
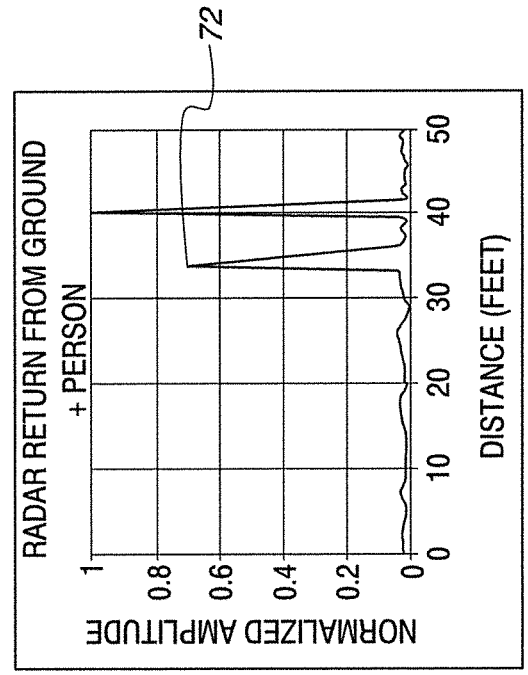
Figure 5C:
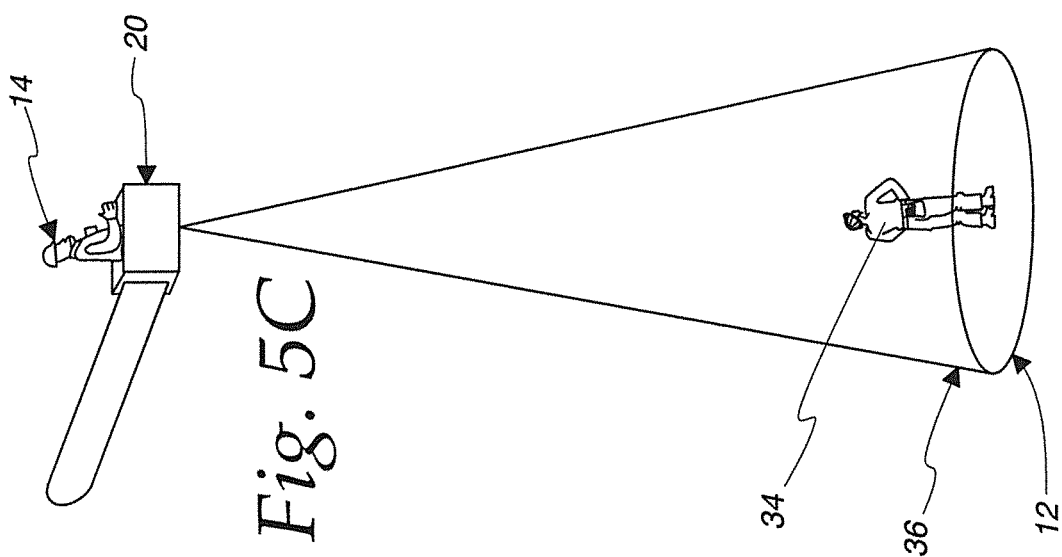

With respect to the determination of the presence or absence of a person in the restricted area 12, the I & Q output can be processed to derive the inference of whether a person is present or absent in the restricted zone 12. Accordingly, the controller 44 is configured to process the digital bit stream from the module 40 and derive the inference of a person present or absent in the restricted area. The system 30 can be configured for automatic re-initialization, stabilization and recalibration of the radar for every stabilized position of the lift bucket 20 after the bucket 20 has moved. In this regard, the system 30 is configured to calibrate automatically with the background terrain within the restricted area 12 each time the position of the bucket 20 is changed and/or each time the size of the restricted area 12 is changed. The system 30 then detects the presence or absence of a person by discriminating the range radar data with the background terrain radar data, as illustrated, for example, by a comparison of the radar return data graphically illustrated in FIGS. 5A and 5B, with FIG. 5A showing the data consistent with just the background terrain, and FIG. 5B showing a discrepancy 72 from the background data inferring the presence of a person. The system 30 can also be configured to store the data as an event recording for processing of the scenario.

The signal processing can utilize advanced digital signal processing (DSP) algorithms and compute a set of fast Fourier transform (FFT) algorithms. The controller 44 can display the data in various forms, such as, for example, tabular, graphs (see, for example, FIGS. 5A and 5B), and alphanumeric characters. In addition to sending the alert signal 70 to the receiver modules 42, the controller 44 can also be configured to generate a local alarm, in form of an audio, video, or both via the alert transducer system 62. In some embodiments, a false alarm can be reduced or prevented by automatically taking a statistical average of multiple consecutive indications (for example, 3 to 5) that a person is present in the restricted area before actually signaling an alarm.

Figure 4:
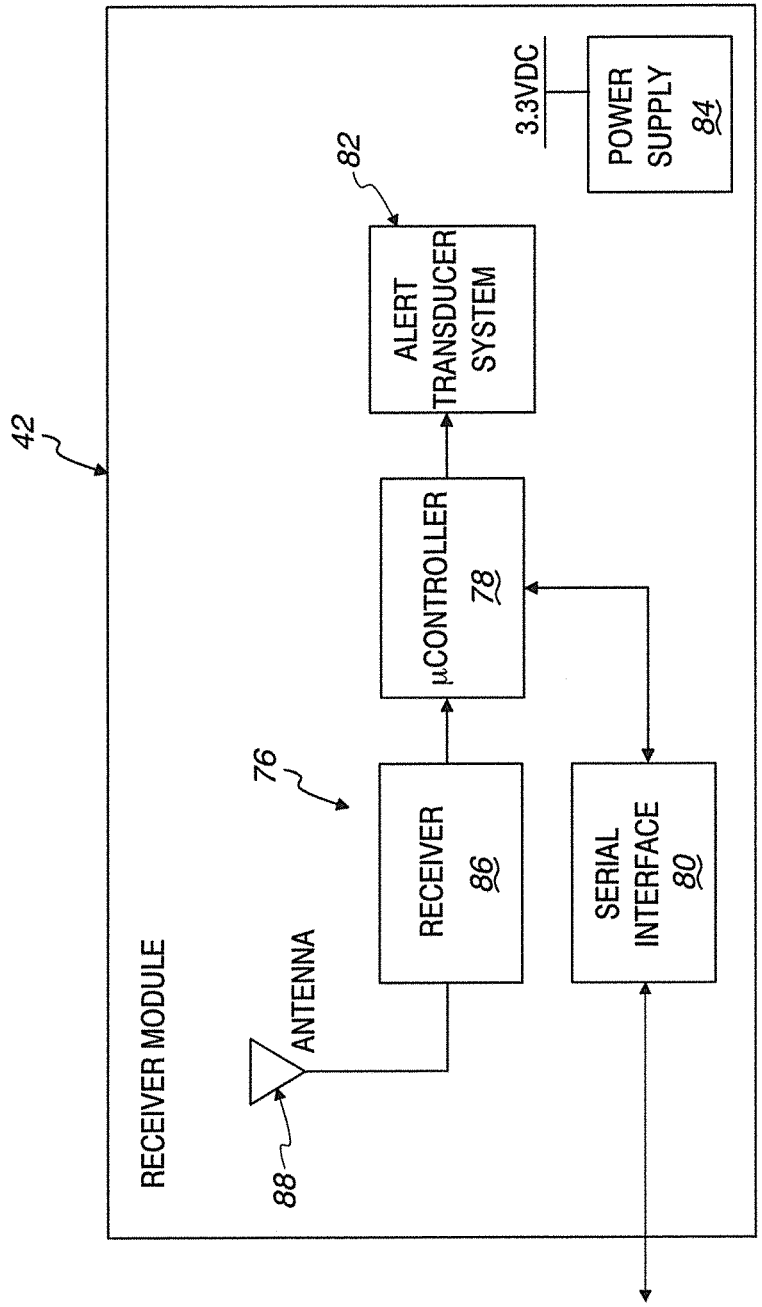
FIG. 4 is a diagrammatic representation of an active receiver module for use in the system and method of FIGS. 1-3.

While there are many known handheld or user carried devices (such as cellular phones, pagers, wireless radios, etc.) that can receive and process wireless signals to initiate an alarm (visual, audio, or both) in response to an wireless alert signal, as best seen in FIG. 4, in one embodiment, each receiver module 42 includes a receiver section 76, a programmable processor in the form of a microcontroller 78, a serial interface 80, an alert transducer system or annunciator 82, and a power supply 84 connected to provide power to the components 76, 78, 80 and 82 of the receiver module 42. The receiver section 76 includes a receiver 86 and a receiving antenna 88. The power supply 84 will typically be in the form of a battery, and in some embodiments a rechargeable battery. The microcontroller 78 is configured to initiate the alert transducer system 82 to provide an alarm (audio, visual, and/or vibrational) to the lineworker 34 carrying the module 42 in response to reception of the alert signal 70 by the receiver section 76.

The wireless transceivers and receivers of the system 10 can be any suitable, conventional wireless transceiver or receiver, such as any conventional wireless router or modem, configured to operate according to any suitable relatively low power radio/wireless communication protocol, such as wireless signals operating according to Bluetooth protocols in the ISM band from 2400 to 2800 megahertz, signals operating according to Zigbee protocols such as IEEE 802.15.4, signals operating under ultra-wide band protocols, such as IEEE 802.14.4a, and signals operating under so-called Wi-Fi or wireless local area network protocols, such as signals operating under IEEE 802.11 standards, from 2400 to 2800 megahertz, signals operating. In this regard, it is anticipated that Wi-Fi protocols will be the most often used in most applications of the system 10 for wireless transmissions between the module 40 and the controller 44, and that. Bluetooth and/or Zigbee protocols will be most often used for the alert signal from the controller 44 to the receiver modules 42.

While certain specific embodiments have been shown and described herein, it should be appreciated that other embodiments and modifications are possible within the scope of the disclosure and that specific structures and steps should not be read into the claims unless expressly recited therein. For example, in some embodiments it may be desirable for the Doppler radar module 40 to be configured to automatically transmit a wireless alert signal to the receiver modules 42 to activate an alarm in each of the receiver modules 42 if the Doppler radar module 40 determines that a person has entered the restricted area 12. In this regard, the controller could be integrated with the Doppler radar module to form a single package. It should further be appreciated that while the system and method 10 have been described herein in connection with elevated power transmission lines, the system and method 10 may be employed in any situation wherein a worker or other person is temporarily elevated above a site that may be entered by other people or personnel. Accordingly, the system and method 10 are not limited to use in connection with elevated power transmission lines. It should further be understood that in some situations, the system and method 10 described herein may be employed when just a load, such as a pallet of commercial or construction items, is temporarily elevated above a site that may be entered by other people or personnel.

It should be appreciated that the system 10 can help to ensure that a personnel do not enter the restricted area 12, can provide better human factors to the personnel at a work site for seamless functioning thus improving safety, efficiency and simplicity of operation, can eliminate the need to deploy manual barricades and/or manual restriction systems, can reduce the work site risk when work is being performed at height, and by providing greater safety and reduced risk can reduce legal, medical, and insurance spending for an employer and the employees.

The invention claimed is:

1. A method for monitoring restricted areas below a temporarily elevated worker, the method comprising the steps of:
    elevating a Doppler radar module to an elevated location adjacent a worker that is temporarily positioned above ground level;
    enabling the Doppler radar module to detect the presence of other personnel who enter a ground level restricted area below the Doppler radar module and the worker;
    automatically alerting personnel who enter the restricted area in response to detection of the personnel by the Doppler radar module;
    lowering the Doppler radar module from the elevated location in response to the worker returning to ground level;
    disabling the Doppler radar module; and
    wherein the enabling step comprises automatically adjusting a size of the restricted area in response to changes in height of the elevated location.

2. The method of claim 1 wherein the enabling step comprises determining a Doppler effect in response to a radio frequency signal being reflected off of a person in the restricted area.

3. The method of claim 1 further comprising moving the Doppler radar module with the worker in response to changes in the position of the worker.

4. The method of claim 3 further comprising the step of attaching the Doppler radar module to a lift platform that alters the position of the worker above ground level.

5. The method of claim 1 further comprising the step of temporarily attaching the Doppler radar module to a pole structure that is ascended by the worker.

6. The method of claim 1 further comprising the step of attaching the Doppler radar module to a lift platform that alters the position of the worker above ground level.

7. The method of claim 1 wherein the enabling step comprises calibrating the Doppler radar module based on a radar return signal from the background terrain within the restricted area.

8. The method of claim 7 further comprising the step of automatically calibrating the Doppler radar module with the background terrain in response to a change in the elevated location.

9. The method of claim 1 comprising the step of detecting the presence or absence of personnel in the restricted area in response to a change in a radar return signal.

10. The method of claim 1 further comprising the step of wirelessly transmitting a data signal representative of a received Doppler radar signal from the Doppler radar module to a controller and processing the data signal in the controller to determine the presence or absence of personnel in the restricted area.

11. The method of claim 10 comprising the step of wirelessly transmitting an alert signal from the controller to at least one wireless receiver configured to receive the alert signal and generate an alarm to a person carrying the wireless receiver.

12. The method of claim 1 further comprising the step of converting an intermittent frequency signal generated by the Doppler radar module to In-phase & Quadrature channel data.

13. The method of claim 12 further comprising the step of converting the intermittent frequency signal to a digital bit stream.

14. The method of claim 1 further comprising the step of generating an alert signal based upon a statistical average of data derived from multiple consecutive return radar signals received by the Doppler radar module.

15. A system for monitoring restricted areas below a temporarily elevated worker, the system comprising:
    a Doppler radar module configured to detect the presence of personnel who enter a ground level, restricted area below the Doppler radar module when the Doppler radar module is elevated to an elevated location adjacent a temporarily elevated worker; and
    a programmable processor configured to automatically adjust the predetermined size of the restricted area in response to changes in height of the elevated location.

16. A system for monitoring restricted areas below a temporarily elevated worker, the system comprising:
    a Doppler radar module configured to detect the presence of personnel who enter a ground level, restricted area below the Doppler radar module when the Doppler radar module is elevated to an elevated location adjacent a temporarily elevated worker, the Doppler radar module being further configured to wirelessly transmit a data bit stream representative of a return radar signal received by the Doppler radar module.

17. The system of claim 16 further comprising:
    a controller configured to receive the data bit stream from the Doppler radar module and to determine the presence of personnel who enter the ground level, restricted area based upon an automatic analysis of the data bit stream; and
    a plurality of receivers configured to receive a wireless alert signal from the controller and to activate an alarm to notify personnel carrying the wireless receivers of the presence of a person in the ground level, restricted area.

18. The system of claim 16 wherein the Doppler radar module is further configured to generate an intermittent frequency signal representative of a radar signal received by the Doppler radar module, to convert the intermittent frequency signal to In-Phase & Quadrature channel data, and to further convert the In-Phase and Quadrature channel data to a data bit stream for wireless transmission.

* * * * *